United States Patent
Zakharov et al.

[11] Patent Number: 6,065,432
[45] Date of Patent: May 23, 2000

[54] TWO-STROKE ENGINE OPERATION METHOD AND INTERNAL COMBUSTION TWO-STROKE ENGINE

[76] Inventors: Evgeny Nikolaevich Zakharov, kv.127, d.15, korp. 3, ul. Starobitsevskaya, Moscow, 113628; Genya Tyo, kv.4, d.14, per. Ogorodnaya Sloboda, Moscow, 101000, both of Russian Federation

[21] Appl. No.: 09/227,933

[22] Filed: Jan. 8, 1999

Related U.S. Application Data

[63] Continuation-in-part of application No. PCT/RU97/00218, Jul. 10, 1997.

[30] Foreign Application Priority Data

Jul. 11, 1996 [RU] Russian Federation ............ 96114297

[51] Int. Cl.$^7$ .................................................. F02D 39/04
[52] U.S. Cl. ........................................ 123/65 V; 123/65 P
[58] Field of Search ................... 123/65 V, 65 P, 123/65 PE, 73 R, 73 PP

[56] References Cited

U.S. PATENT DOCUMENTS

| | | | |
|---|---|---|---|
| 4,516,540 | 5/1985 | Nerstom | 123/73 PP |
| 4,660,514 | 4/1987 | Nerstrom | 123/65 V |
| 5,072,699 | 12/1991 | Pien | 123/73 PP |
| 5,081,961 | 1/1992 | Paul et al. | 123/65 V |
| 5,261,359 | 11/1993 | Hull | 123/65 V |
| 5,379,732 | 1/1995 | Mavinahally et al. | 123/73 PP |

*Primary Examiner*—John Kwon

[57] ABSTRACT

The present invention relates to operation processes of two-stroke engines. A two-stroke engine uses a slide valve (10) so that the inlet-outlet passage (9) connected to the exhaust manifold (18) may be connected to the inlet pipe after the outlet of exhaust gases from the cylinder (4). A fresh load is then introduced into the cylinder (4) simultaneously through a scavenging port (6) connected to the crankshaft chamber (2) by a scavenging passage, and through an inlet-outlet port (8) connected to the inlet pipe. The crankshaft chamber (2) is filled when the piston (5) moves from the bottom dead center after the port (8) is opened at its lower edge. Practically continuous feeding of fresh loads into a single-cylinder engine can thus be achieved. The increase in the time-section ration of the gas distribution organs ensures maximum filling of the cylinder (4) while reducing the time therefor and the losses to a minimum. The heat, which is emitted at the surface of the hottest parts after the outlet, is instantaneously eliminated by the cold fresh loads passing therethrough.

11 Claims, 10 Drawing Sheets

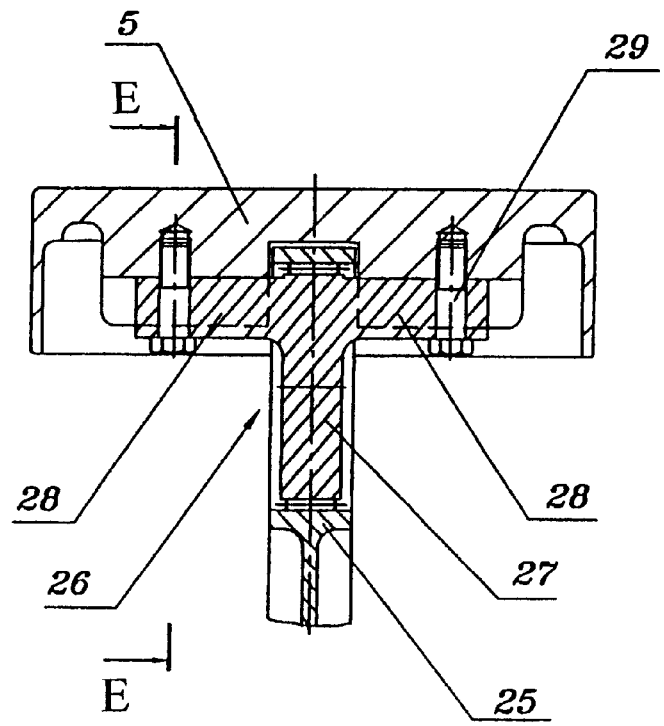
Фиг. 13
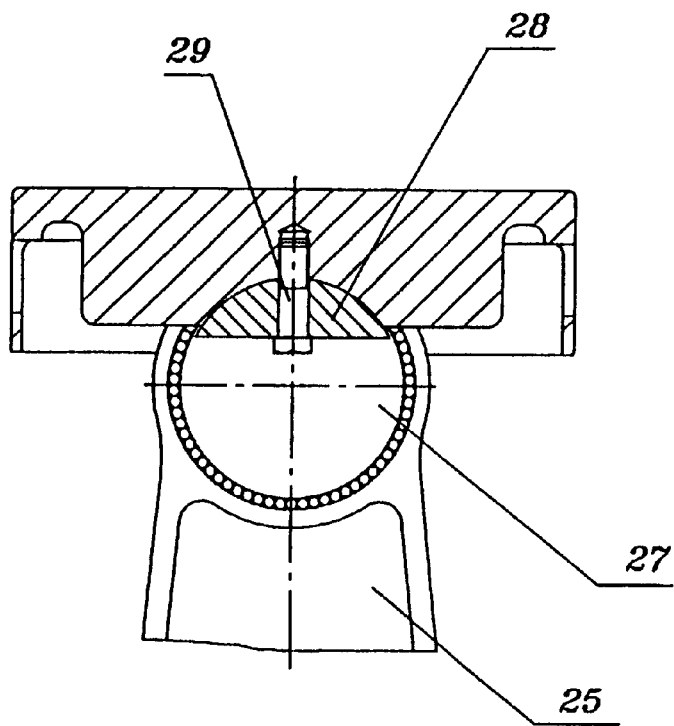
Fig. 14

TWO-STROKE ENGINE OPERATION METHOD AND INTERNAL COMBUSTION TWO-STROKE ENGINE

This is a continuation-in-part of co-pending International Application PCT/RU97/00218 filed on Jul. 10, 1997 designating the United States.

FIELD OF THE INVENTION

The present invention relates to mechanical engineering, particularly, to engine designs, and, more particularly, to designs and operation methods of internal combustion engines.

BACKGROUND OF THE INVENTION

Described in RU, C1, 2017993 is a method of operating a two-stroke engine, which comprises compressing and combusting a fresh charge in a cylinder as a piston ascends towards the top dead centre, expanding combustion products in the cylinder as the piston moves away from the top dead centre, exhausting spent gases from the cylinder through an exhaust port uncovered by an upper edge of the piston, an exhaust passage and a slide valve into an exhaust pipe, scavenging and filling the cylinder with a compressed fresh charge passing through a scavenging port as the piston approaches the bottom dead centre, wherein when the piston is near the bottom dead centre, the slide valve disconnects the exhaust passage and the exhaust pipe and connects them after the cylinder has been scavenged and filled.

A problem with the above method is its poor specific characteristics due to a low degree of filling the cylinder and the great thermal stress suffered by the piston, the exhaust ports and the exhaust system as a whole.

Another conventional method of operating a two-stroke internal combustion engine comprises compressing and combusting a fresh charge in a cylinder as a piston ascends towards the top dead centre, expanding combustion products in the cylinder as the piston descends from the top dead centre, exhausting spent gases from the cylinder through an inlet-outlet port uncovered by an upper edge of the piston, an inlet-outlet passage and a slide valve into an exhaust pipe, scavenging and filling the cylinder with a compressed fresh charge passing through a scavenging port when the piston approaches the bottom dead centre, wherein when the piston is near the bottom dead centre, the inlet-outlet passage is disconnected by the slide valve from the exhaust pipe and connected through the slide valve with the inlet pipe (see US, A1, 5081961). As compared to the prior art mentioned first, the method increases the degree of filling the cylinder owing to the improved time-to-section ratio of the inlet gas distribution elements. This effect is achieved owing to the fact that the exhaust passage and port, upon performing their primary function, i.e. exhaust, act as the inlet elements. The thermal stress of the engine components is also reduced owing to cooling by the fresh charge.

The aforementioned measures, however, are insufficient to provide the highest specific parameters possible. Furthermore, the prior art embodiment having two slide valves fails to take advantage of the significant prospects of improving the time-to-section as compared to the embodiment having a single slide valve, described in the same reference.

SU, A1, 56419 discloses a two-stroke internal combustion engine comprising a crankcase with a crankshaft installed therein, at least one cylinder connected to the crankcase, a piston mounted within the cylinder and kinematically connected to the crankshaft, the cylinder having a scavenging port communicating with a compressed fresh charge source and an inlet-outlet port communicating with an inlet-outlet passage, a slide valve being mounted within the inlet-outlet passage to alternately connect the passage with an inlet pipe and an exhaust pipe.

The above engine suffers the same problems as the conventional operation methods.

SUMMARY OF THE INVENTION

It is an object of the present invention to provide an engine having improved specific parameters and enhanced reliability.

The object of the invention is attained by providing a method of operating a two-stroke internal combustion engine, comprising the steps of: compressing and combusting a fresh charge within a cylinder as a piston ascends towards the top dead centre; expanding combustion products in the cylinder as the piston descends from the top dead centre; exhausting spent gases from the cylinder through an inlet-outlet port uncovered by an upper edge of the piston, an inlet-outlet passage and a slide valve into an exhaust pipe; scavenging and filling the cylinder with a compressed fresh charge admitted through a scavenging port when the piston approaches a bottom dead centre, wherein when the piston is near the bottom dead center, the inlet-outlet passage is disconnected by the slide valve from the exhaust pipe and connected through the slide valve to the inlet pipe, wherein in accordance with the present invention, prior to the filling of the cylinder, the fresh charge is admitted into a crankshaft chamber through the slide valve, the inlet-outlet passage and the inlet-outlet port uncovered by the lower edge of the piston ascending towards the top dead centre, the steps of scavenging and filling the cylinder being accomplished by passing the charge from the crankshaft chamber.

The fresh charge may be admitted through the inlet pipe under an excess pressure.

The fresh charge in the crankshaft chamber may be compressed simultaneously with expanding combustion products in the cylinder.

The object of the invention is further attained by a two-stroke internal combustion engine comprising: a crankcase with a crankshaft installed therein, at least one cylinder connected to the crankcase, the cylinder having a scavenging port communicating with a compressed fresh charge source and an inlet-outlet port connected to an inlet-outlet passage; a piston disposed within the cylinder and kinematically connected to the crankshaft, a slide valve mounted within the inlet-outlet passage so that to alternately connect the inlet-outlet passage with an inlet pipe and an exhaust pipe, wherein in accordance with the present invention, the crankcase defines a crankshaft chamber communicating with the scavenging port via a scavenging passage and connected with the inlet pipe through the slide valve, the inlet-outlet passage and the inlet-outlet port uncovered by the lower edge of the piston ascending towards the top dead centre.

The crankshaft chamber may be used as the compressed fresh charge source.

The slide valve may be disposed within a cylindrical cavity and include a disk separator mounted at the end of the crankshaft in the plane normal to its rotation axis, the disk separator having a sealing over its radial surface, and a sector member disposed at an end face of the separator and contacting an end face of the crankcase, wherein the slide valve is mounted within the cavity so that to form an inlet receiver and an exhaust manifold that are connected with the inlet pipe and the exhaust pipe, respectively, the slide valve having an exhaust passage in the region of the sector member, the inlet-outlet passage being made in the end face of the crankcase to periodically communicate with the exhaust manifold through the exhaust passage The sector member may be made in the form of a counter weight.

Symmetrically about the inlet-outlet port, the cylinder may be provided with an additional inlet-outlet port connected with an additional inlet-outlet passage, an additional slide valve being mounted in the additional inlet-outlet passage so that to alternately connect the additional passage with the exhaust pipe and the inlet pipe.

The cylinder may be provided with an additional scavenging port communicating with the crankshaft chamber through an additional scavenging passage.

The scavenging ports and the inlet-outlet ports may be arranged in perpendicular planes.

The engine may comprise a charger connected to the inlet pipe.

BRIEF DESCRIPTION OF THE DRAWINGS

FIG. 13 illustrates a connecting rod and piston assembly for the engine in accordance with the invention;

FIG. 14 is a similar view taken through line E—E of FIG. 13.

DESCRIPTION OF THE PREFERRED EMBODIMENT

Figure 1:
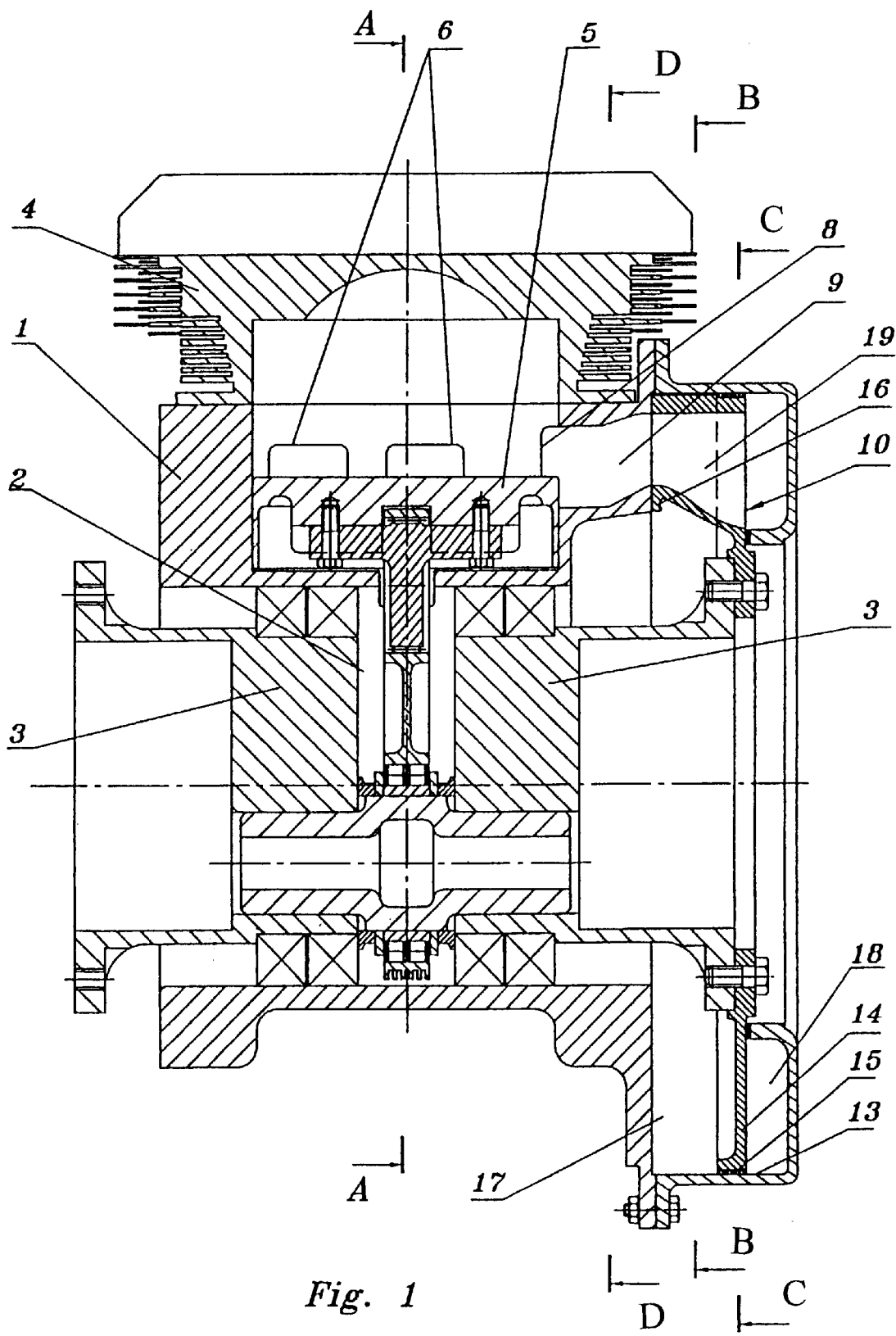
FIG. 1 illustrates a cross section of an engine for implementing a method in accordance with the present invention.
Figure 2:
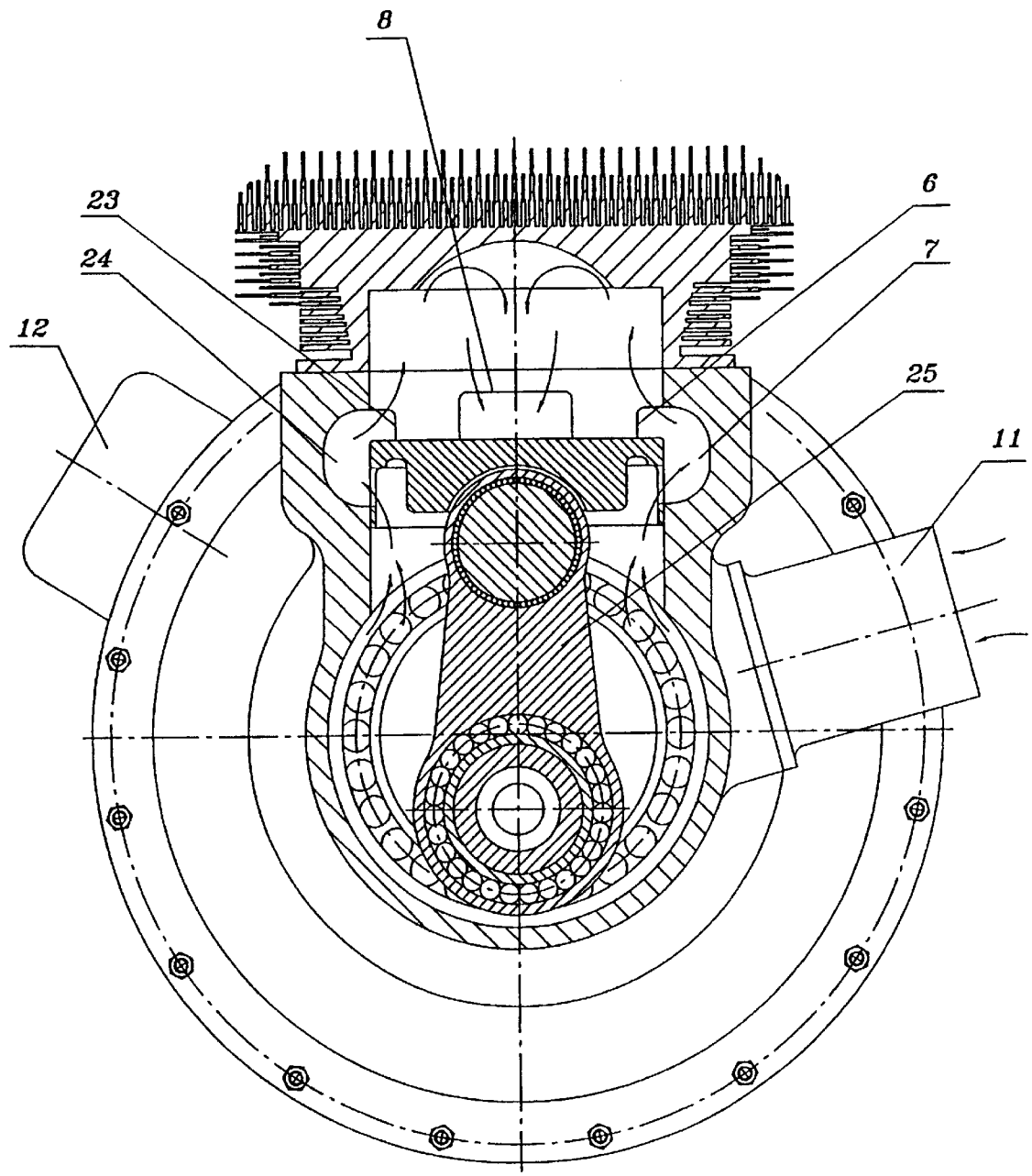
FIG. 2 is a sectional view taken through line A—A of FIG. 1.
Figure 3:
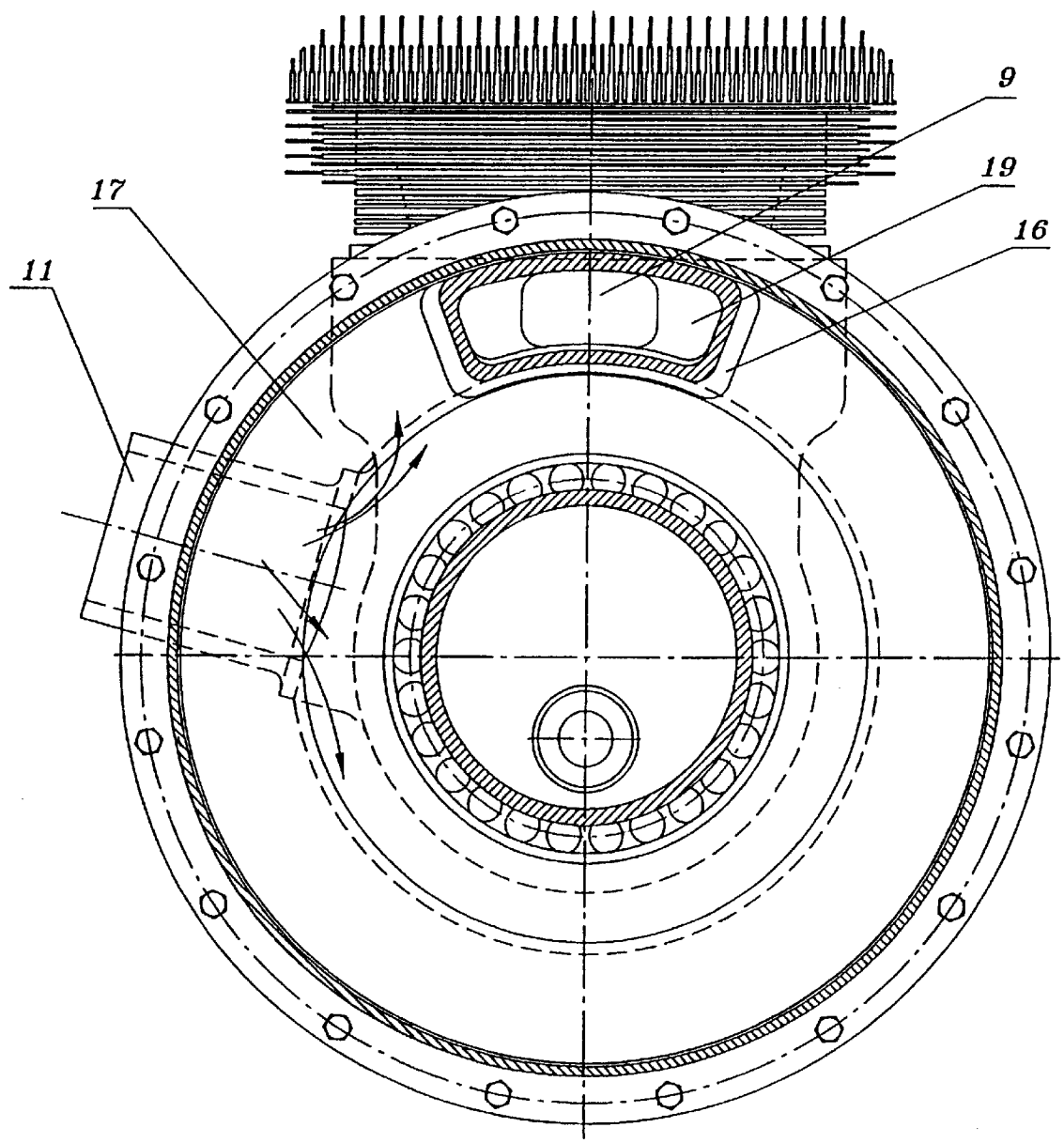
FIG. 3 is a sectional view taken through line B—B of FIG. 1.
Figure 4:
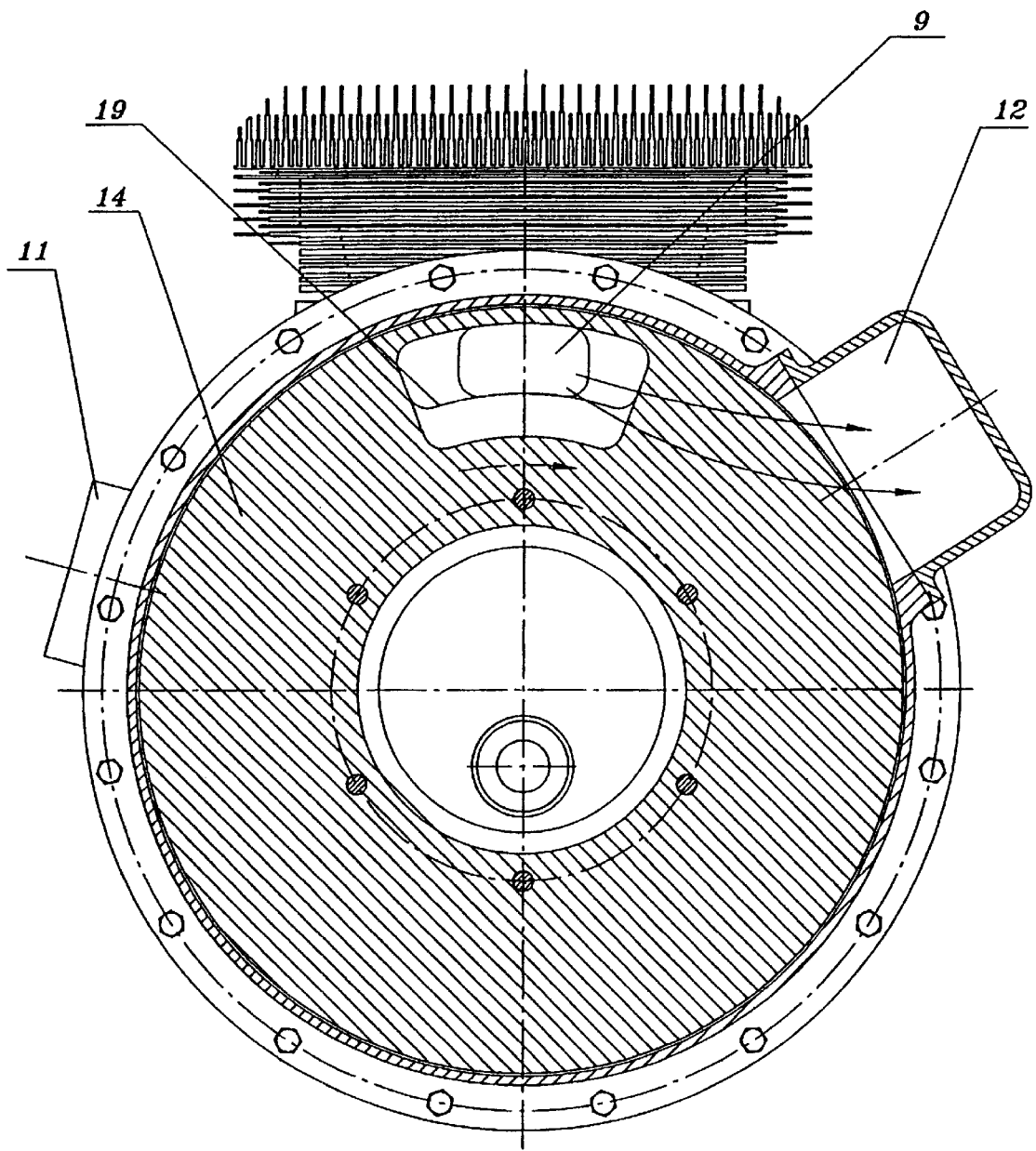
FIG. 4 is a sectional view taken through line C—C of FIG. 1.
Figure 5:
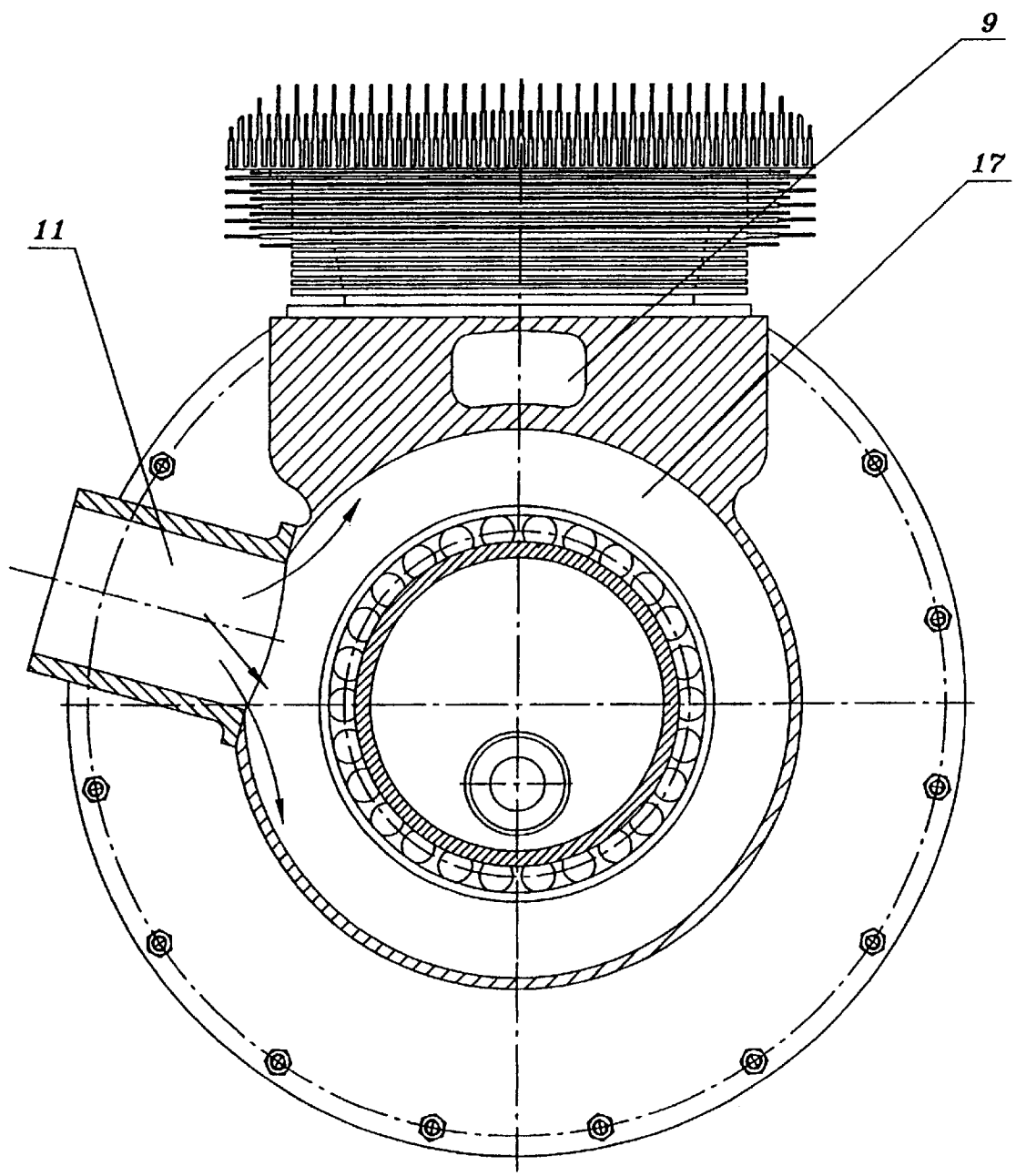
FIG. 5 is a sectional view taken through line D—D of FIG. 1.

Referring now to the drawings in detail, a method in accordance with the present invention is accomplished in an engine comprising a crankcase 1 defining a crankshaft chamber 2 and having a crankshaft 3 installed therein, a cylinder 4 with a piston 5 mounted therein and kinematically coupled to the crankshaft 3. The cylinder 4 has a scavenging port 6 communicating with the crankshaft chamber 2 via scavenging passages 7, and an inlet-outlet port 8 connected with an inlet-outlet passage 9. Mounted within the inlet-outlet passage 9 is a slide valve 10 adapted to alternately connect the passage 9 with an inlet pipe 11 and an exhaust pipe 12.

The slide valve 10 is located within a cylindrical cavity 13 and includes a disk separator 14 mounted at the end of the crankshaft 3 and having a sealing 15 over its radial surface, and a sector member 16 disposed at an end face of the separator 14 and contacting the end face of the crankcase 1. The slide valve 10 is located within the cavity 13 so that to form an inlet receiver 17 and an exhaust manifold 18 connected with the inlet pipe 11 and the exhaust pipe 12, respectively. In the region of the sector member 16, the slide valve has an exhaust passage 19, while the inlet-outlet passage 9 is made in an end face of the crankcase 1 so that to periodically communicate with the exhaust manifold 18 via the exhaust passage 19.

The sector member 16 may be made in the form of a counter weight.

Symmetrically about the inlet-outlet port 8, the cylinder 4 may be provided with an additional inlet-outlet port 20 communicating with an additional inlet-outlet passage 21 which has an additional slide valve 22 adapted to alternately connect the additional passage 21 with the exhaust pipe 12 and the inlet pipe 11.

The cylinder 4 may be provided with an additional scavenging port 23 communicating with the crankshaft chamber 2 via an additional scavenging passage 24.

The scavenging ports 6 and 23 and the inlet-outlet ports 8 and 20 are arranged in perpendicular planes.

The engine may have a charger (not shown) connected to the inlet pipe 11.

The piston 5 may be connected to the crankshaft 3 through a connecting rod 25, a piston pin 26 being made in the form of a central cylindrical portion 27 with coaxial cylindrical segments 28 connected thereto. In this case a head of the connecting rod 25 is mounted on the central portion 27, and the segments 28 are urged to the piston 5 by threaded members 29.

Figure 6:
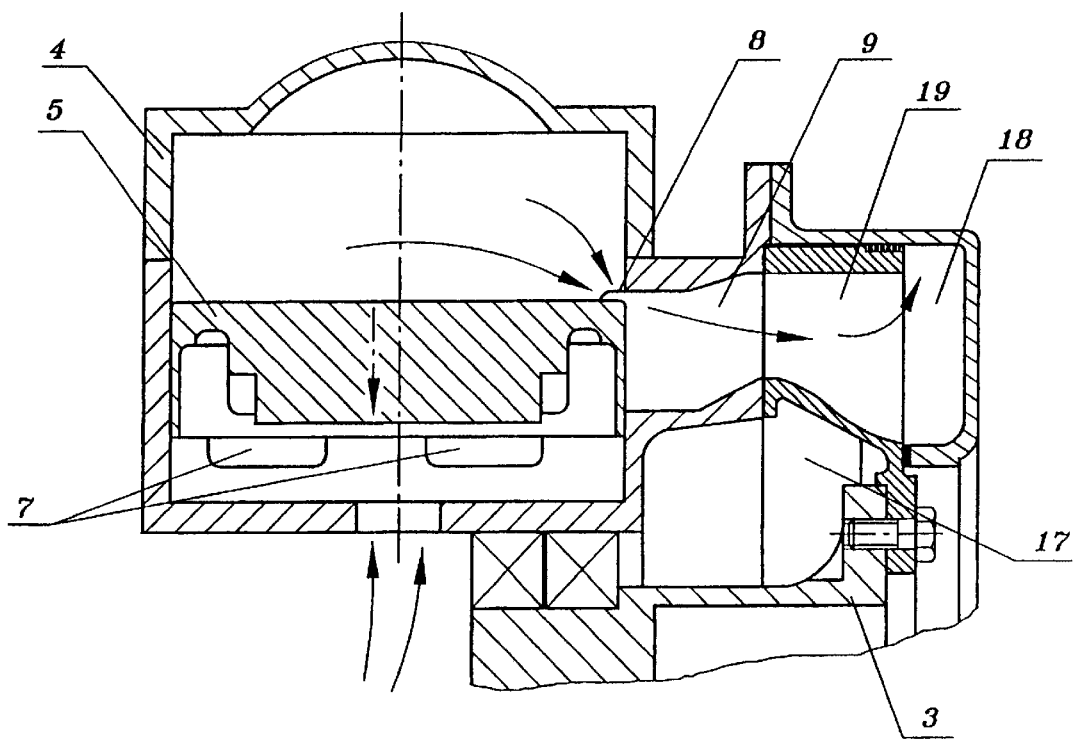
FIG. 6 illustrates schematically the engine at the beginning of the exhaust.
Figure 7:
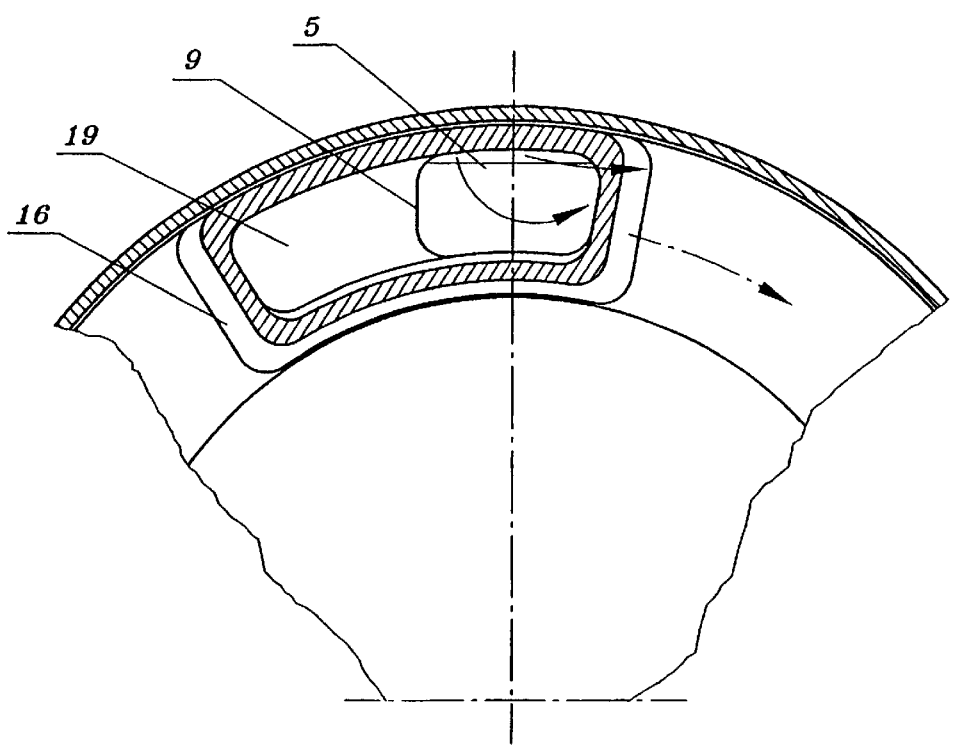
FIG. 7 is a similar view showing a slide valve position through line B—B.
Figure 8:
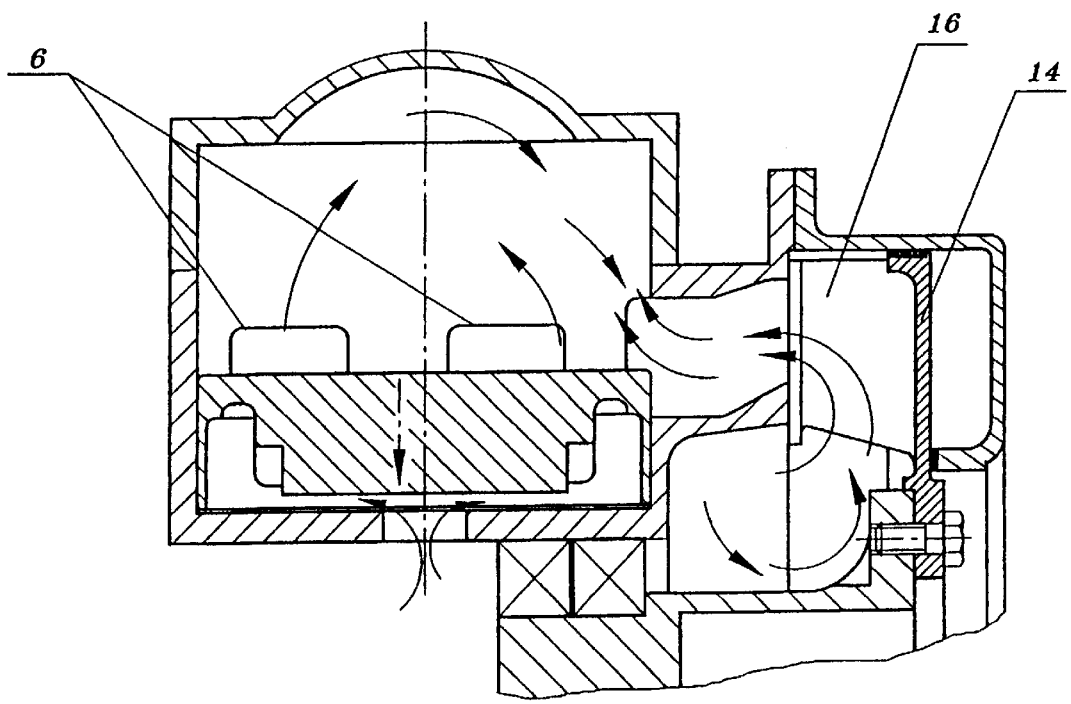
FIG. 8 illustrates a schematic view of an engine at the instant of scavenging and beginning the admission of a fresh charge into the cylinder.
Figure 9:
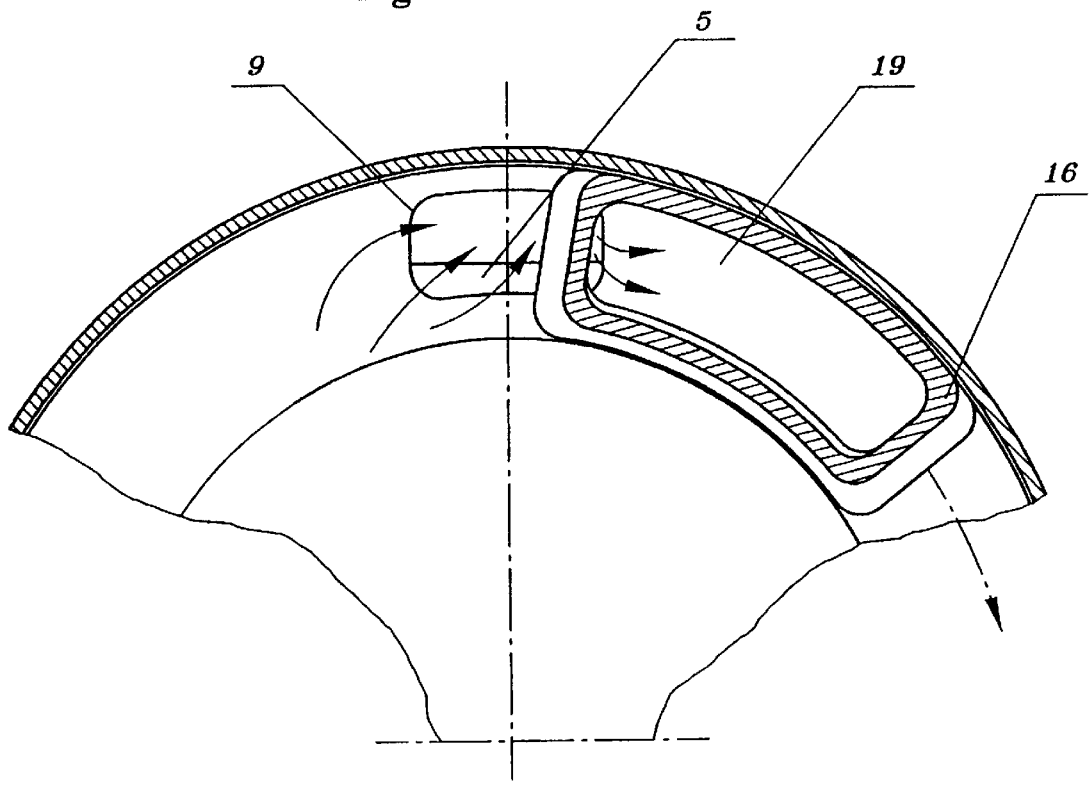
FIG. 9 is a similar view showing a slide valve position through line B—B.
Figure 10:
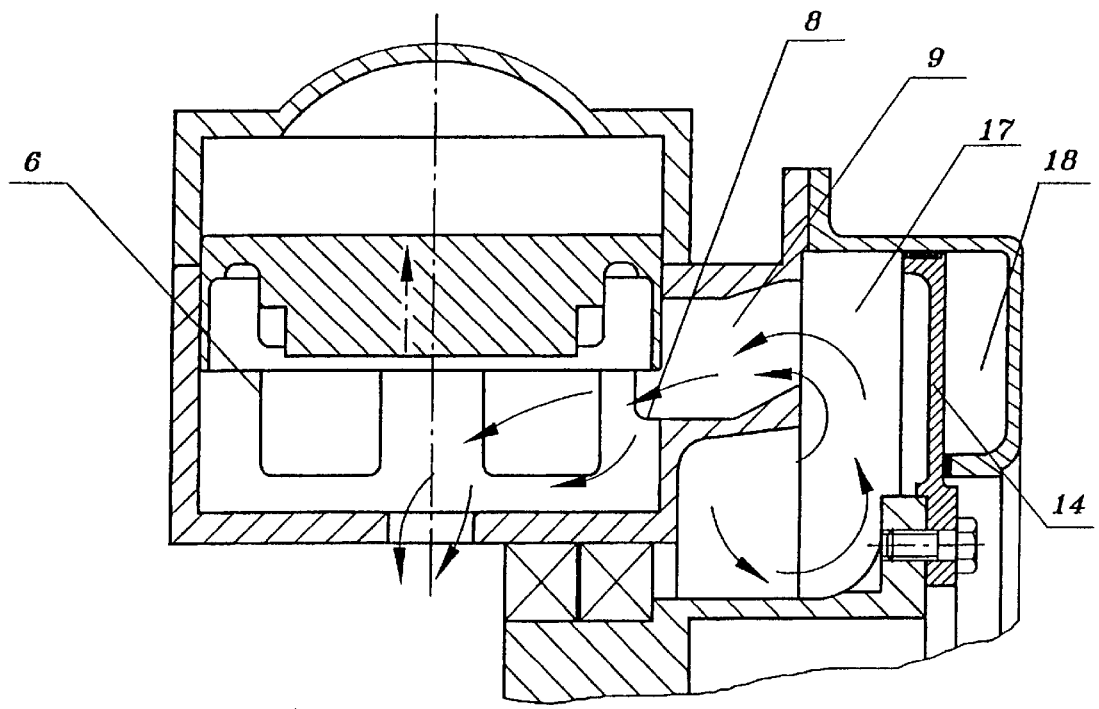
FIG. 10 illustrates the engine at the instant of compressing the charge in the cylinder and beginning the admission of the charge into the crankshaft chamber.
Figure 11:
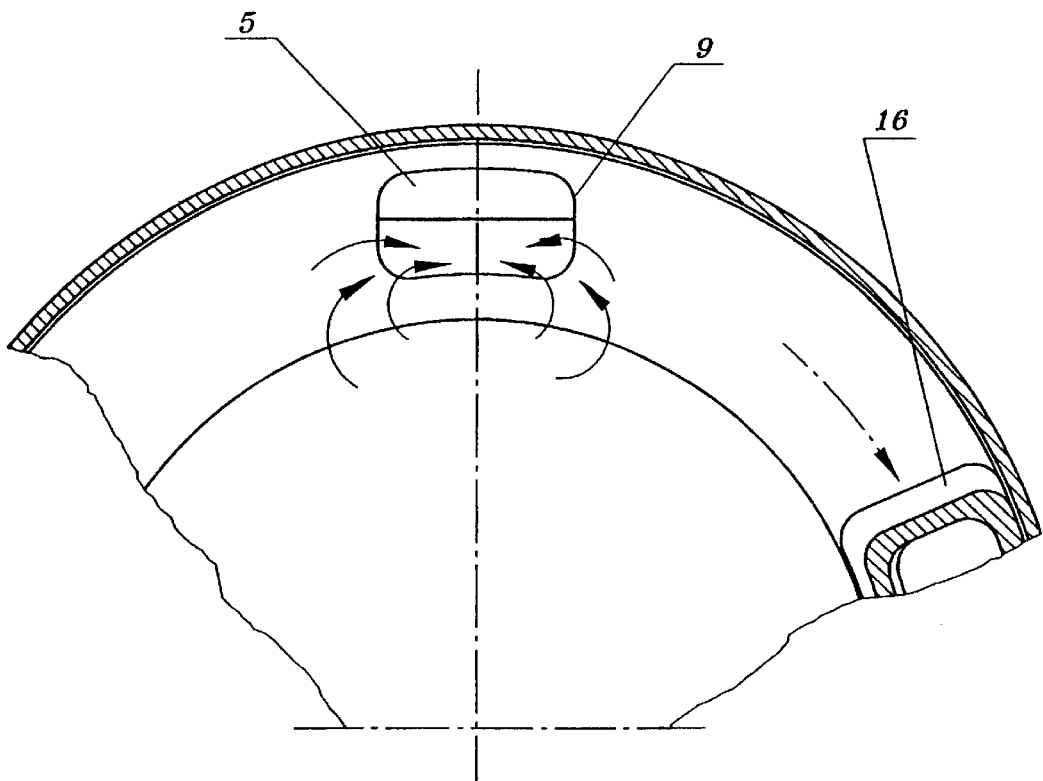
FIG. 11 is a similar view showing a slide valve position through line B—B.

A method in accordance with the present invention is implemented in the engine in the following manner. At the end of the expansion of combustion products in the cylinder 4, the upper edge of the piston 5 descending towards to the bottom dead centre uncovers the inlet-outlet port 8 to initiate the exhaust of spent gases from the cylinder 4 through the inlet-outlet passage 9, the exhaust passage 19 in the slide valve 10 and the exhaust manifold 18 to the exhaust pipe 12 (see FIGS. 6 and 7). As the piston 5 continues its motion towards the bottom dead centre, its upper edge uncovers the scavenging port 6 to start the admission of a compressed fresh charge into the cylinder 4 and to force out residual spent gases to the inlet-outlet port 8, thereby scavenging the cylinder 4 cavity. At the end of the exhaust, the slide valve 10 rotates and interrupts the communication between the passage 9 and the exhaust manifold 18 to terminate the exhaust process, and the fresh charge forced out during the scavenging from the cylinder 4 to the passage 9 either enters again the inlet pipe 11, or, depending on the slide valve design, is entrapped within the inlet-outlet passage 9, generating thereby a pressure wave directed towards the inlet-outlet port 8 and preventing further escape of the fresh charge from the cylinder 4 (see the operation process description in Reference 1). Similarly to the prior art methods, the fresh charge losses to the exhaust pipe 12 are eliminated which significantly improves the engine efficiency. With a charger being provided (not shown), on termination of the exhaust a compressed fresh charge is admitted into the inlet-outlet passage 9 from the inlet pipe 11 via the inlet receiver 17, and the cylinder 4 is filled simultaneously through the ports 6 and 8, enabling the appropriate boost of the two-stroke engine up to the required degree (see FIGS. 8 and 9). In this embodiment of the operation process, the time-to-section ratio of the ports 6 and 8 is several times greater than the maximum time-to-section ratio possible in four-stroke engines. The filling process continues when the piston 5 ascends from the bottom dead centre until its upper edge sequentially covers first the scavenging port 6 and then the inlet-outlet port 8, whereupon the process of compressing the fresh charge in the cylinder 4 starts. As the piston 5 continues its ascent from the bottom dead centre, the lower edge of the piston 5 uncovers the inlet-outlet port 8, and a fresh charge is admitted into the crankshaft chamber 2 from the inlet pipe 11 via an inlet manifold 17 and the passage 9 either due to negative pressure in the chamber 2 or under the pressure created by the charger (see FIGS. 10 and 11). As this takes place, the combustion products are combusted and expanded in the cylinder whereupon the cycle repeats.

The slide valve 10 operates in the following manner. The disk separator 14 permanently divides the cavity 13 into the inlet receiver 16 and the exhaust manifold 17 using the radial seal 15 mating the inner cylindrical surface of the cavity 13. The sector member 16 of the slide valve 10 permanently contacts the end face of the crankcase 1, and the exhaust passage 19 provided in the slide valve 10 is arranged at the same radius about the rotation axis of the crankshaft 3 as the passage 9 provided in the end face of the crankcase 1. When the passages 19 and 9 are aligned within a predetermined range of the rotation angle of the slide valve 10, the cylinder 4 cavity communicates with the exhaust pipe 12, and the exhaust occurs. In the absence of the communication between the passages 19 and 9, the inlet-outlet passage 9 is in permanent communication with the inlet pipe 11 via the inlet receiver 17.

Figure 12:
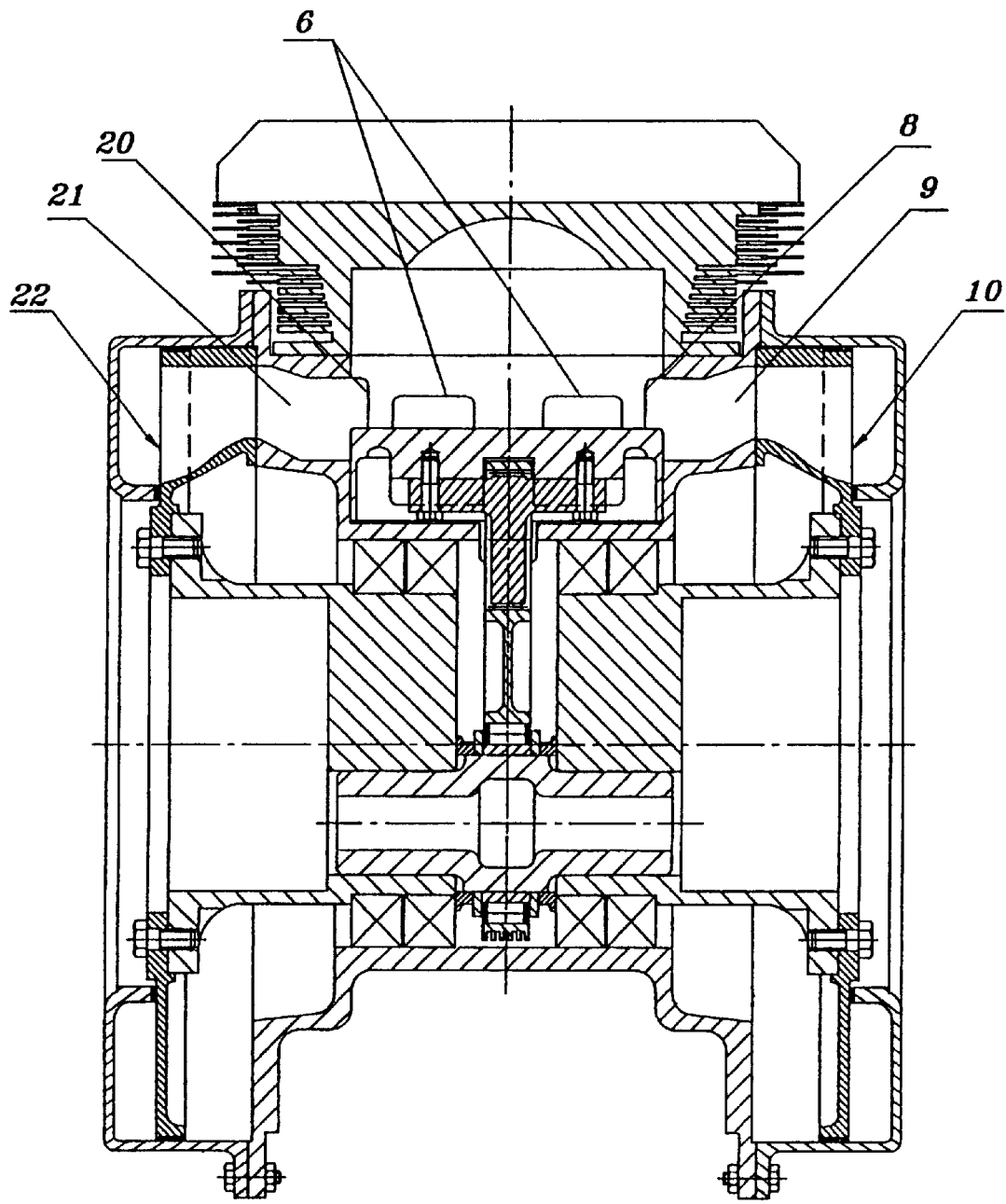
FIG. 12 shows a cross section of an engine embodiment as set forth in claim 8.

When the engine is provided with a pair of symmetrical slide valves 10 and 22 (see FIG. 12), the above process takes place simultaneously in two identical systems, which essentially improves the time-to-section ratio of the gas distribution elements.

Thus, the task of increasing the filling of the engine cylinder 4 (in the preferred embodiment having two slide valves 10 and 22) is solved by pre-filling the crankshaft chamber 2 with the substantially simultaneous admission of a fresh charge into the cylinder 4 both through the scavenging ports 6 and 23 and inlet-outlet ports 8 and 20, which ensures about the twofold increase in the inlet time-to-section ratio as compared to the two slide valve embodiment disclosed in the most pertinent prior art (US, A1, 5981961).

In the single slide valve embodiment, the effect is attained owing to decreased mechanical losses for driving the charger, or due to abandoning the charger at all (the use being made of the suction and compression effects in the crankshaft chamber 2), or owing to the more even admission of the compressed charge (except the short intervals during the periods of closing the port 8 by the side surface of the piston 8, and at the beginning of the exhaust) which lowers the required increase in the charger pressure and instantaneous flow rate, and, in the case of employing a centrifugal charger, improves the operation conditions in terms of gas dynamics. That means that the fresh charge admission occurs in the substantially uninterrupted manner even in a one-cylinder engine.

The improved time-to-section ratio of an internal combustion engine makes it possible to increase the rotation frequency of its shaft without the decrease in the efficient power. This is provided by the reduced time for filling the cylinder.

The conventional engines partially solve the task of lowering the thermal stress of the engine, in particular, of the piston bottom, the edges of the gas distribution ports and the exhaust passages. The operation processes disclosed in both references provide the reduction in the thermal stress of the above parts owing to passing the cold fresh charge through them. However, the possibility of additional admission of the fresh charge via the crankshaft chamber 2 provided by the operation process in accordance with the invention ensures the three times increase in the amount of the cold charge passing through the exhaust elements. It enables all excess heat which has not managed to penetrate into the material depth to be removed from the surface of the hottest parts (the port 8 edges, the passage 9 wall and the piston 5), and, hence, improves operational parameters of the process, also owing to the increased filling of the engine cylinder, without adverse effects to its operation reliability. Additionally, the employment of the crankshaft chamber 2 in the operation process ensures a drastic decrease in the thermal stress of the entire piston 5 not only due to fanning its walls with the cold charge through the ports 8 and 20, but also due to the intense cooling of the piston inner surface by the fresh charge admitted into the crankshaft chamber 2 and compressed therein, and by scavenging.

The alignment between the rotation axes of the slide valve 10 and the shaft 3 permits the dimensions of the exhaust passage 19 to be best fitted to the engine gas distribution phases without substantial degradation in the weight and dimension characteristics. As to the conventional engines (References 2 and 3), the slide valve shapes and arrangements prohibit the improvement in the time-to-section ratio of the passages switched by them.

In addition, the alignment between the slide valve and shaft axes makes it possible to install a counter weight on the slide valve. The possibility of installing the counter weight at a relatively large rotation radius essentially lowers the weight to be balanced, and the selected relative arrangement of the piston 5 and the sector member 16 permits the employment of the latter as the counter weight. In so doing, the removal of the counter weights from the crankshaft chamber provides the possibility of making the chamber more compact and minimizing the idle space therein. Thus, the technical solution above results in the essential improvement of the specific weight and dimension characteristics of the engine.

Additionally, it should be noted that the stepped shape of the piston pin 25 with cylindrical segments 28 makes it possible, at the large diameter of its central portion 27 with the connecting rod 25 head mounted, to reduce the overall weight of the piston 5, arrange it closer to the shaft 3 and decrease the connecting rod 25 length and weight. The relatively great diameter of the central portion 27 permits its width to be reduced and, hence, the load capacity of the piston pin 26 can be raised both owing to the increased surfaces that take the gas load, the enhanced rigidity of the pin and the elimination of bending forces therein. Since the segments 28 of the piston pin 26 are urged against the piston 5 underside by the threaded members 29, the connecting rod and piston arrangement can be easily assembled, in particular when the central portion 27 and the connecting rod 25 head engage through rolling members. The reduced length of the connecting rod 25 provides a way of decreasing the idle space in the crankshaft chamber 2 and enhancing the gas dynamic parameters of the operation process.

INDUSTRIAL APPLICABILITY

The present invention can be employed in designing and manufacturing two-stroke internal combustion engines. Taken together, a two-stroke engine and a method of operating thereof in accordance with the invention solve the basic problems of the two-stroke engines, such as the inferior efficiency caused by great fresh charge losses during scavenging and mechanical losses for driving the charger, the high thermal stress of the piston and the exhaust system components. In combination with the conventional advantages of two-stroke engines such as specific weight and dimension characteristics, simplicity, reliability and low cost, the solution of the above problems provides a means for improving the two-stroke engine parameters to achieve the level of the "formula" motor volumetric capacity with the life of tens of thousand of hours.

What is claimed is:

1. A method of operating a two-stroke internal combustion engine, said method comprising the steps of:

compressing and combusting a fresh charge within a cylinder as a piston ascends towards a top dead centre;

expanding combustion products in the cylinder as the piston descends from the top dead center;

exhausting spent gases from the cylinder through an inlet-outlet port uncovered by an upper edge of the piston, an inlet-outlet passage and a slide valve to an exhaust pipe;

scavenging and filling the cylinder with a compressed fresh charge admitted through a scavenging port when the piston approaches a bottom dead centre, wherein when the piston is near the bottom dead centre the inlet-outlet passage is disconnected by the slide valve from the exhaust pipe and connected through the slide valve to the inlet pipe, wherein prior to the filling of the cylinder, the fresh charge is admitted into a crankshaft chamber through the slide valve, the inlet-outlet passage and the inlet-outlet port uncovered by the lower edge of the piston ascending towards the top dead centre, the steps of scavenging and filling the cylinder being performed by passing the charge from the crankshaft chamber.

2. A method of claim 1, wherein said fresh charge is admitted through the inlet pipe under an excess pressure.

3. A method of claim 1, wherein said step of compressing the fresh charge in the crankshaft chamber and said step of expanding combustion products in the cylinder are accomplished simultaneously.

4. A two-stroke internal combustion engine comprising:

a crankcase with a crankshaft installed therein, at least one cylinder connected to the crankcase, said cylinder having a scavenging port communicating with a compressed fresh charge source and an inlet-outlet port connected to an inlet-outlet passage, a piston disposed within the cylinder and kinematically coupled to the crankshaft, a slide valve mounted within the inlet-outlet passage so that to alternately connect said passage with an inlet pipe and an exhaust pipe, wherein said crankcase defines a crankshaft chamber communicating with the scavenging port through a scavenging passage and connected with the inlet pipe through the slide valve, the inlet-outlet passage and the inlet-outlet port uncovered by the lower edge of the piston ascending towards the top dead centre.

5. An engine of claim 4, wherein said crankshaft chamber is used as the fresh charge source.

6. An engine of claim 4, wherein said slide valve is disposed within a cylindrical cavity and includes a disk separator mounted at the end of the crankshaft in the plane normal to its rotation axis, said disk separator having a sealing over a radial surface thereof, and a sector member disposed at an end face of the disk separator and contacting an end face of the crankcase, wherein the slide valve is mounted within said cavity so that to form an inlet receiver and an exhaust manifold that are connected with the inlet pipe and the exhaust pipe, respectively, said slide valve having an exhaust passage in the region of the sector member, said inlet-outlet passage being made in the end face of the crankcase to periodically communicate with the exhaust manifold through said exhaust passage.

7. An engine of claim 6, wherein said sector member is made in the form of a counter weight.

8. An engine of claim 4, wherein said cylinder has an additional inlet-outlet port symmetrical about said inlet-outlet port, the additional inlet-outlet port being connected with an additional inlet-outlet passage having an additional slide valve mounted therein so that to alternatively connect said additional passage with the exhaust pipe and the inlet pipe.

9. An engine of claim 4, wherein said cylinder has an additional scavenging port communicating with the crankshaft chamber through an additional scavenging passage.

10. An engine of claim 9, wherein said scavenging ports and said inlet-outlet ports are arranged in perpendicular planes.

11. An engine of claim 4, comprising a charger connected to the inlet pipe.

* * * * *